(12) United States Patent
Zhang et al.

(10) Patent No.: US 7,141,314 B2
(45) Date of Patent: Nov. 28, 2006

(54) CPP GMR AND MAGNETOSTRICTION IMPROVEMENT BY LAMINATING $Co_{90}Fe_{10}$ FREE LAYER WITH THIN $Fe_{50}Co_{50}$ LAYERS

(75) Inventors: Kunliang Zhang, Fremont, CA (US); Min Li, Dublin, CA (US); Rachid Sbiaa, Nagano (JP); Simon Liao, Fremont, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 93 days.

(21) Appl. No.: 10/786,806

(22) Filed: Feb. 25, 2004

(65) Prior Publication Data

US 2005/0186452 A1    Aug. 25, 2005

(51) Int. Cl.
*G11B 5/39* (2006.01)

(52) U.S. Cl. .................. 428/811.2; 428/811.5; 428/812; 360/324.11; 360/324.12

(58) Field of Classification Search ............ None
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 5,891,586 A * | 4/1999 | Hasegawa et al. | 428/668 |
| 6,127,045 A * | 10/2000 | Gill | 428/611 |
| 6,226,197 B1 | 5/2001 | Nishimura | 365/171 |
| 6,344,954 B1 | 2/2002 | Redon et al. | 360/324.2 |
| 6,473,279 B1 | 10/2002 | Smith et al. | 360/324.12 |
| 6,674,617 B1 * | 1/2004 | Gill | 360/324.12 |
| 6,870,716 B1 * | 3/2005 | Gill | 360/324.12 |
| 2002/0085323 A1 * | 7/2002 | Smith et al. | 360/324.12 |
| 2004/0179311 A1 * | 9/2004 | Li et al. | 360/324.12 |
| 2004/0252418 A1 * | 12/2004 | Horng et al. | 360/324.12 |

OTHER PUBLICATIONS

"The scalability of CPP-GMR heads toward over 100 Gbpsi, compared with TMR heads", by M. Takagishi et al., TMR2001, Aug. 20, 2001, Toshiba.
"Output enhancement of spin-valve giant magnetoresistance in current-perpendicular-to-plane geometry", by H. Yuasa et al., Jrnl. of Appl. Phys., vol. 92, No. 5, Sep. 1, 2002, pp. 2646-2650.

* cited by examiner

*Primary Examiner*—Kevin M. Bernatz
(74) *Attorney, Agent, or Firm*—Saile Ackerman LLC; Stephen B. Ackerman

(57) ABSTRACT

A current-perpendicular-to-plane (CPP) giant magnetoresistive (GMR) sensor of the synthetic spin valve type and its method of formation are disclosed, the sensor including a novel laminated free layer having ultra-thin (less than 3 angstroms thickness) laminas of $Fe_{50}Co_{50}$ (or any iron rich alloy of the form $Co_xFe_{1-x}$ with x between 0.25 and 0.75) interspersed with thicker layers of $Co_{90}Fe_{10}$ and Cu spacer layers to produce a free layer with good coercivity, a coefficient of magnetostriction that can be varied between positive and negative values and a high GMR ratio, due to enhancement of the bulk scattering coefficient by the laminas. The configuration of the lamina and layers in periodic groupings allow the coefficient of magnetostriction to be finely adjusted and the coercivity and GMR ratio to be optimized. The sensor performance can be further improved by including layers of Cu and $Fe_{50}Co_{50}$ in the synthetic antiferromagnetic pinned layer.

13 Claims, 7 Drawing Sheets

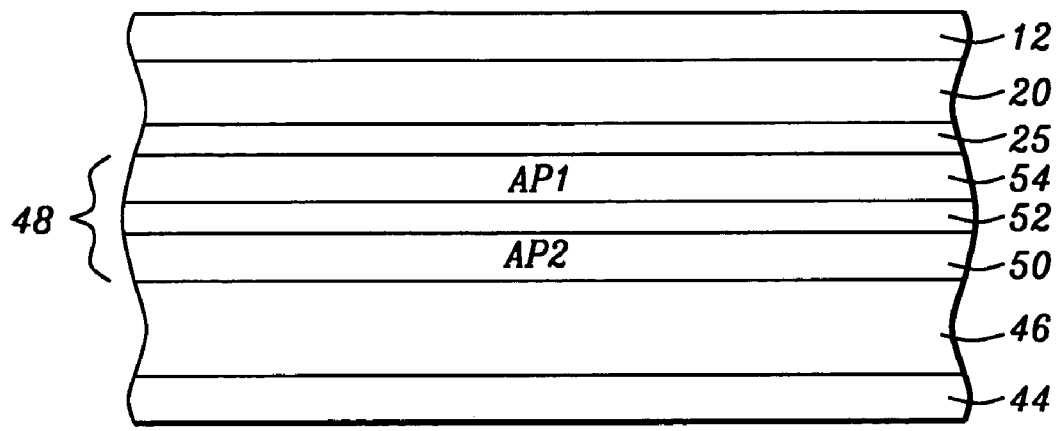
FIG. 1 – Prior Art
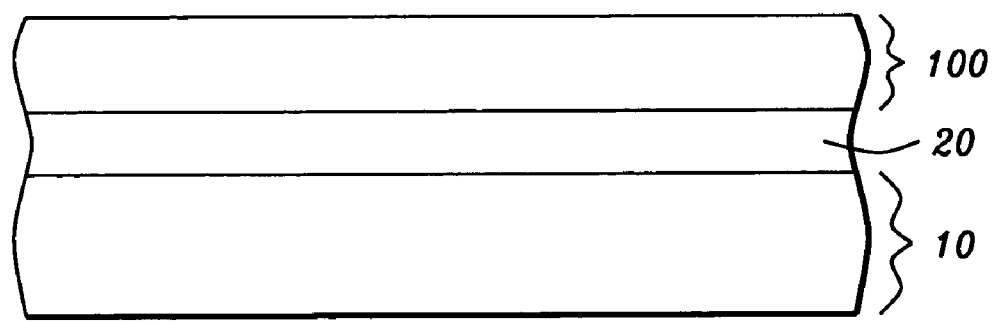
FIG. 2a – Prior Art

CPP GMR AND MAGNETOSTRICTION IMPROVEMENT BY LAMINATING CO$_{90}$FE$_{10}$ FREE LAYER WITH THIN FE$_{50}$CO$_{50}$ LAYERS

BACKGROUND OF THE INVENTION

1. Field of the Invention

This invention relates generally to giant magnetoresistive (GMR) magnetic field sensors having a spin valve structure and a "current-perpendicular-to-the-plane" (CPP) configuration. More particularly, it relates to such a sensor that has both an enhanced GMR ratio and low coefficient of magnetostriction.

2. Description of the Related Art

Magnetic read sensors that utilize the giant magnetoresistive (GMR) effect for their operation are generally of the "current-in-the-plane" (CIP) configuration, wherein current is fed into the structure by leads that are laterally disposed to either side of an active sensor region and the current moves through the structure essentially within the planes of its magnetic and other conducting layers. Since the operation of GMR sensors depends on the detection of resistance variations in their active magnetic layers caused by changes in the relative directions of their magnetic moments, it is important that a substantial portion of the current passes through those layers so that their resistance variations can have a maximally detectable effect. Unfortunately, CIP GMR sensor configurations typically involve layer stacks comprising layers that are electrically conductive but not magnetically active and that play no role in providing resistance variations. As a result, portions of the current are shunted through regions that produce no detectable responses and, thereby, the overall sensitivity of the sensor is adversely affected. The CPP sensor configuration avoids this current shunting problem by disposing its conducting leads vertically above and below the active sensor stack, so that all of the current passes perpendicularly through all of the layers as it goes from the lower to the upper lead. The CPP configuration thereby holds the promise of being effective in reading magnetically recorded media having recording densities exceeding 100 Gbit/in$^2$.

The pertinent prior art cited below has offered no similar method for improving the sensitivity of the CPP design having a synthetic spin valve stack configuration. Lederman et al. (U.S. Pat. No. 5,627,704) discloses a CPP GMR stack structure formed within a gap located in one of two pole layers of a magnetic yoke structure which also has a transducing gap formed in an ABS plane. The two pole pieces of the yoke serve to guide magnetic flux to the GMR stack which has current leads above and below it and permanent magnet biasing layers horizontally disposed on either side of it.

Dykes et al. (U.S. Pat. No. 5,668,688) discloses a spin valve CPP configuration in which the active layers form a stack of uniform width disposed between upper and lower shield and conductor layers.

Smith et al. (U.S. Pat. No. 6,473,279) teaches a CPP-GMR sensor whose ferromagnetic free layer is maintained in a single domain state by a layer configuration in which the free layer is separated from a pinning layer (below the free layer) by a non-magnetic spacer layer and an additional ferromagnetic layer is formed above the free layer and separated from it by an additional non-magnetic spacer layer formed of Ru. The Ru layer induces an anti-ferromagnetic exchange coupling between the additional ferromagnetic layer and the free layer and there is also a direct magnetostatic coupling between the additional ferromagnetic layer and the free layer. This combined interaction stabilizes the domain state of the free layer.

Redon et al. (U.S. Pat. No. 6,344,954) teaches a magnetoresistive tunnel junction whose ferromagnetic free layer and pinned layers are made of various layers of spin polarizing materials.

Nishimura (U.S. Pat. No. 6,226,197) teaches a magnetic thin film memory using a variety of ferromagnetic layered materials While the prior art cited above does make use of ferromagnetic materials like those to be used in the novel formation of the present invention, they do not address the issue of improving the sensitivity of a CPP device by a the formation of a free layer having improved magnetic characteristics. In particular, a good free layer for read head operation should be magnetically soft (have low coercivity) so that it can easily respond to external magnetic field fluctuations, yet it must also exhibit a small positive magnetostriction between $10^{-6}$ and $10^{-7}$ to reduce stress-induced magnetic anisotropy common in a free layer that is typically under compressive stress. The method of the present invention will produce such an improved free layer. In addition, the method of the present invention can also be advantageously applied to the formation of a synthetic antiferromagnetic pinned layer with improved characteristics. The cited prior art does not make reference to the improvement of CPP device performance by either such free layer or pinned layer improvement.

SUMMARY OF THE INVENTION

Accordingly, it is a first object of this invention is to provide a novel current-perpendicular-to-plane (CPP) giant magnetoresistive (GMR) read-sensor stack structure of a synthetic spin valve configuration, having improved sensitivity and small positive magnetostriction.

It is a second object of this invention to provide a method to controllably optimize the magnetostriction of a free layer to fulfill requirements of specific applications.

It is a third object of this invention to provide a method of improving CPP GMR sensor performance by the formation of a synthetic antiferromagnetic pinned layer having improved characteristics.

The objects stated above will be achieved by a novel laminated free layer configuration within a CPP synthetic spin valve design and/or a novel laminated pinned layer configuration. The free layer comprises layers of CoFe or CoFe laminated on Cu (CoFe when used hereinafter will refer specifically to Co$_{90}$Fe$_{10}$ of approximately 5 angstroms thickness, interspersed with very thin layers (called lamina herein, because of their thinness) of FeCo (specifically Fe$_{50}$Co$_{50}$) of less than 3 angstroms but preferably approximately 0.5 angstroms thickness. While the examples discussed below will all use Fe$_{50}$Co$_{50}$, the same advantages of the present invention can be obtained by using layers of any of the Fe-rich ferromagnetic alloys Co$_{75}$Fe$_{25}$, Co$_{70}$Fe$_{30}$, Co$_{60}$Fe$_{40}$, Co$_{65}$Fe$_{35}$ or more generally Co$_x$Fe$_{1-x}$ with x between 0.25 and 0.75. Therefore, when the symbol FeCo is used hereinafter, it will refer to layers of the Fe-rich ferromagnetic alloys such as Co$_{75}$Fe$_{25}$, Co$_{70}$Fe$_{30}$, Co$_{60}$Fe$_{40}$, Co$_{65}$Fe$_{35}$ or, more generally Co$_x$Fe$_{100-x}$ with x between 25 and 75.

While FeCo, used alone or grown on a Cu layer (FeCo/Cu), has certain properties that are advantageous in a free layer, it has other properties that make it undesirable for that use. For example, FeCo has larger bulk and interface spin asymmetry parameters than a CoFe layer, which is advantageous. On the other hand, FeCo has a high coercivity and a large positive magnetostriction, both of which are distinctly disadvantageous. CoFe by itself or when grown on a Cu layer (CoFe/Cu), on the other hand, has a low coercivity, which is distinctly advantageous in a free layer, yet it also has a large negative magnetostriction, in the range between $-10^{-6}$ to $-10^{-7}$, which is disadvantageous.

The objects of the present invention will be realized by interspersing thin lamina of FeCo with thicker layers of CoFe and Cu spacer layers in repeated structures. These combinations will retain the low coercivity of the CoFe, introduce the advantageous spin asymmetry of the FeCo while bringing magnetostriction values within the acceptable positive limits between $10^{-7}$ and $10^{-6}$ by combining the large positive magnetostriction values of the FeCo with the large negative magnetostriction values of the CoFe. In addition, the bulk and interface properties of the FeCo enhance the overall bulk scattering coefficient of the laminated free layer, thereby enhancing the CPP GMR ratio. Moreover, the arrangement and multiplicity of the lamina make it possible to fine-tune the coercivity and magnetostriction of the free layer, which is distinctly advantageous for the fabrication of a variety of devices.

The novel laminated free layer will be formed within a typical CPP bottom synthetic type spin valve structure common in the prior art, such as that illustrated schematically in FIG. 1. The CPP structure may or may not also include the novel pinned layer to be described below. The layers of such a CPP structure include a seed layer (44), an antiferromagnetic pinning layer (46), a synthetic antiferromagnetic pinned layer (48) further comprising a second ferromagnetic layer (denoted AP2) (50), a coupling layer (52) and a first ferromagnetic layer (AP1) (54), a Cu spacer layer (25), a ferromagnetic free layer (20) and a capping layer (12). In such a prior art formation the AP1 and AP2 layers would typically be layers of CoFe in a thickness range of between approximately 20–40 angstroms and the free layer (20) would also be a layer of CoFe within the same thickness range or a layer of CoFe grown on a layer of Cu (not shown). Biasing layers and conductor layers are not shown. In the present invention, the novel laminated free layer will replace the single free layer of CoFe shown in the figure.

The novel laminated pinned layer configuration, which can be used alone or in conjunction with the novel free layer, refers specifically to a new formation of the structure of the first ferromagnetic layer (AP1), which is (54) in FIG. 1. Two different laminated AP1 layers were formed and tested in a CPP sensor stack that was otherwise identical. AP1 layer "A," which may be considered a reference layer, was formed in a multiply laminated configuration: (CoFe 10/Cu 2)×7/CoFe 10, which means seven repeated layers of 10 angstrom thick CoFe on 2 angstrom thick Cu, formed on a 10 angstrom thick layer of CoFe. This configuration was compared to AP1 layer "B," which was formed as (CoFe10/Cu2)×3/(FeCo10/Cu2)×3/FeCo10. Thus, in configuration B, part of AP1 is replaced by FeCo10/Cu2 laminations, keeping the total magnetic moment of AP1 constant.

BRIEF DESCRIPTION OF THE DRAWINGS

FIG. 1 is a schematic cross-sectional view through the air-bearing surface (ABS) of a prior art CPP GMR sensor configuration of the synthetic spin valve type.

FIGS. 2*a–e* are schematic cross-sectional views of five sample CPP GMR sensor configurations, four of which (b–e) incorporate the laminated free layer structures of the present invention and one of which (a) is a reference configuration. These are used to make coercivity and magnetostriction comparisons.

FIG. 5*b* refers to the configuration shown schematically in FIG. 4*b*.

DESCRIPTION OF THE PREFERRED EMBODIMENTS

The present invention is a GMR spin valve sensor in a CPP (current-perpendicular-to-plane) synthetic pinned layer spin-valve configuration, having a novel laminated free layer of low coercivity and low positive magnetostriction. This sensor may also include a novel laminated synthetic pinned layer. The novel free layer includes multiple thin lamina of FeCo interspersed with thicker layers of CoFe, which can be varied to provide an optimal combination of coercivity and magnetostriction. The novel pinned layer includes a ferromagnetic layer in which layers of FeCo replace layers of CoFe for an improvement in the GMR ratio of the sensor.

Figure 2B:
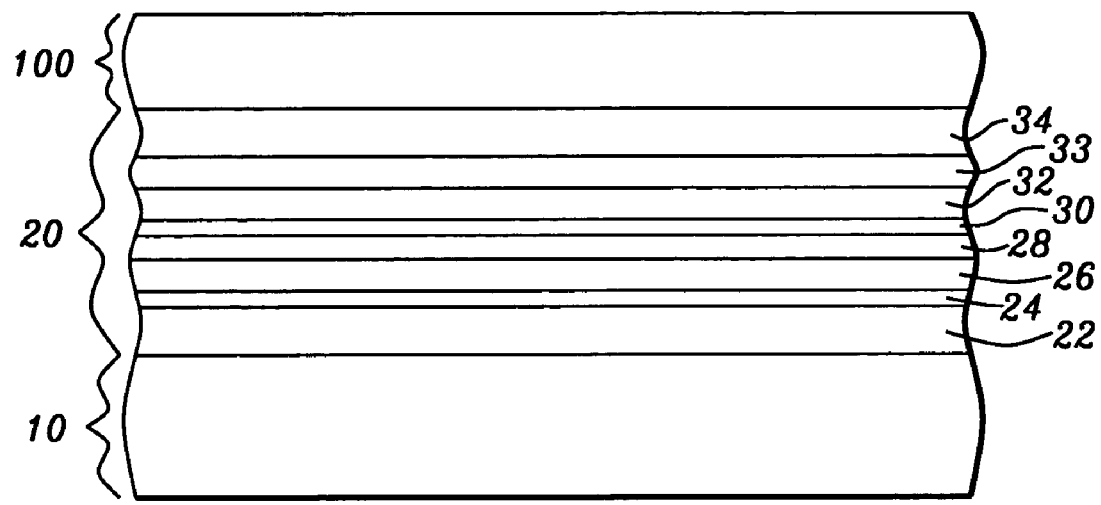

Referring to FIGS. 2*a–e*, there is shown in each figure a schematic cross-sectional view of a stack configuration (a configuration of layers) used to experimentally determine optimum free layer configurations for achieving desired coercivity and magnetostriction values. Within these stack formations, the various layers are formed advantageously by sputtering. FIG. 2*a* is a reference stack having a prior art free layer, while FIGS 2*b–e* are exemplary stacks comprising laminated free layers of the present invention in various configurations. Each stack is formed so that its particular free layer configuration is formed between a substrate layer, which is a [seed layer/pinning layer/spacer layer] and a capping layer, which are the same for each stack. More specifically, each of the five configurations has the form:

Ta50/Ru20/MnPt150/Cu30[Free Layer] Cu10/Ta50 where Ta50 is a layer of tantalum 50 angstroms thick, Ru20 is a layer of ruthenium 20 angstroms thick, MnPt is a layer of antiferromagnetic manganese-platinum 150 angstroms thick and Cu30 is a layer of copper 30 angstroms thick. This combination of five layers, the substrate layer, is referred to simply as (10) in each of the figures, FIGS. 2*a–e*. The capping layer is a layer of copper 10 angstroms thick over which is a layer of tantalum 50 angstroms thick. This capping layer is referred to as (100) in each of the figures FIGS. 2*a–d*. The free layer, denoted generically as (20) in each of the figures, FIGS. 2*a–d*, is configured differently in each figure, and will now be described in detail.

Referring first to FIG. 2*a*, there is shown the prior art reference configuration. There is seen the free layer (20) which is a single layer of CoFe ($Co_{90}Fe_{10}$) formed to a thickness of approximately 30 angstroms, which is typical of a prior art sensor such as illustrated in FIG. 1. Testing of this configuration indicates a coefficient of magnetostriction, $\lambda=-6.90\times10^{-6}$ and a coercivity, $H_c=6$ Oe.

Referring next to FIG. 2b, there is shown a first exemplary free layer (20) which is a laminated configuration formed in accord with the present invention and which will be formed between the substrate (10) and capping layer (100). As we will see in this and the succeeding figures of FIG. 2, the variation of laminas, layers and spacer layers will permit the formation of a free layer with magnetostriction coefficients ranging between positive and negative values.

The first layer of this free layer is a first layer of CoFe (22) formed to a thickness between approximately 5 and 15 angstroms, with approximately 10 angstroms being preferred. On this layer is formed an ultra- thin layer (referred to hereinafter as a lamina) of FeCo (24) of thickness less than 3 angstroms, with approximately 0.5 angstroms being preferred. In all the following examples, FeCo refers specifically to $Fe_{50}Co_{50}$, of thickness less than 3 angstroms, with approximately 0.5 angstroms being preferred; but as has been noted above, more generally $Co_xFe_{100-x}$ with x between 25 and 75 can be used to fulfill the objects of the invention. On this lamina is formed a second layer of CoFe (26) of thickness between approximately 2.5 and 7.5 angstroms, with approximately 5 angstroms being preferred. On this layer is formed a Cu layer (28) of thickness between approximately 1 and 4 angstroms, with approximately 2 angstroms being preferred. The non-magnetic Cu layer acts as a spacer layer and has been experimentally shown to have beneficial effects on the magnetic performance parameters of ferromagnetic layers grown upon it and to allow the advantageous adjustment of magnetostriction values and GMR enhancement. On this Cu layer is formed a third layer of CoFe (30) of thickness between approximately 2.5 and 7.5 angstroms, with approximately 5 angstroms being preferred. On this CoFe layer there is formed a second lamina of FeCo (32) of thickness less than 3 angstroms, with approximately 0.5 angstroms being preferred. On this lamina is formed a second layer of Cu (33) of thickness between approximately 1 and 4 angstroms, with approximately 2 angstroms being preferred. On this Cu layer is formed a fourth layer of CoFe(34) of thickness between approximately 2.5 and 7.5 angstroms, with approximately 5 angstroms being preferred. Testing of this configuration indicates a coefficient of magnetostriction, $\lambda=+9.00\times10^{31\ 7}$ and a coercivity, $H_c=13$.

Figure 2C:
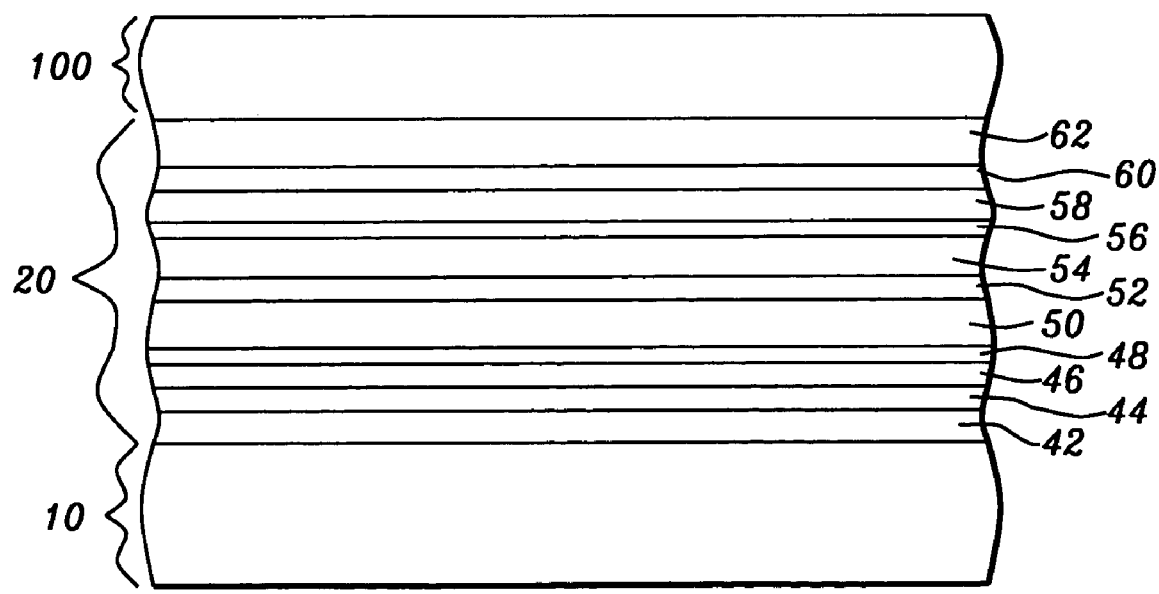

Referring next to FIG. 2c, there is shown a second exemplary free layer (20) which is a laminated configuration formed in accord with the present invention. The first layer of this free layer is a first layer of CoFe (42) formed to a thickness between approximately 2.5 and 7.5 angstroms, with approximately 5 angstroms being preferred. On this layer is formed a layer of Cu (44) of thickness between approximately 1 and 4 angstroms, with approximately 2 angstroms being preferred. On this Cu layer is formed a second layer of CoFe (46) of thickness between approximately 2.5 and 7.5 angstroms, with approximately 5 angstroms being preferred. On this CoFe layer is formed a lamina of FeCo (48) (in all these examples, specifically $Fe_{50}Co_{50}$) of thickness less than 3 angstroms, with approximately 0.5 angstroms being preferred. On this lamina is formed a third layer of CoFe (50) of thickness between approximately 2.5 and 7.5 angstroms, with approximately 5 angstroms being preferred. On this layer is formed a second Cu layer (52) of thickness between approximately 1 and 4 angstroms, with approximately 2 angstroms being preferred. On this Cu layer is formed a fourth layer of CoFe (54) of thickness between approximately 2.5 and 7.5 angstroms, with approximately 5 angstroms being preferred. On this CoFe layer there is formed a second lamina of FeCo (56) of thickness less than 3 angstroms, with approximately 0.5 angstroms being preferred. On this lamina is formed a fifth layer of CoFe (58) of thickness between approximately 2.5 and 7.5 angstroms with approximately 5 angstroms being preferred. On this CoFe layer is then formed a third layer of Cu (60) of thickness between approximately 1 and 4 angstroms, with approximately 2 angstroms being preferred. On this Cu layer is formed a sixth layer of CoFe(62) of thickness between approximately 2.5 and 7.5 angstroms, with approximately 5 angstroms being preferred. Testing of this configuration indicates a coefficient of magnetostriction, $\lambda=-8.90\times10^{-7}$ and a coercivity, $H_c=13.9$.

Figure 2D:
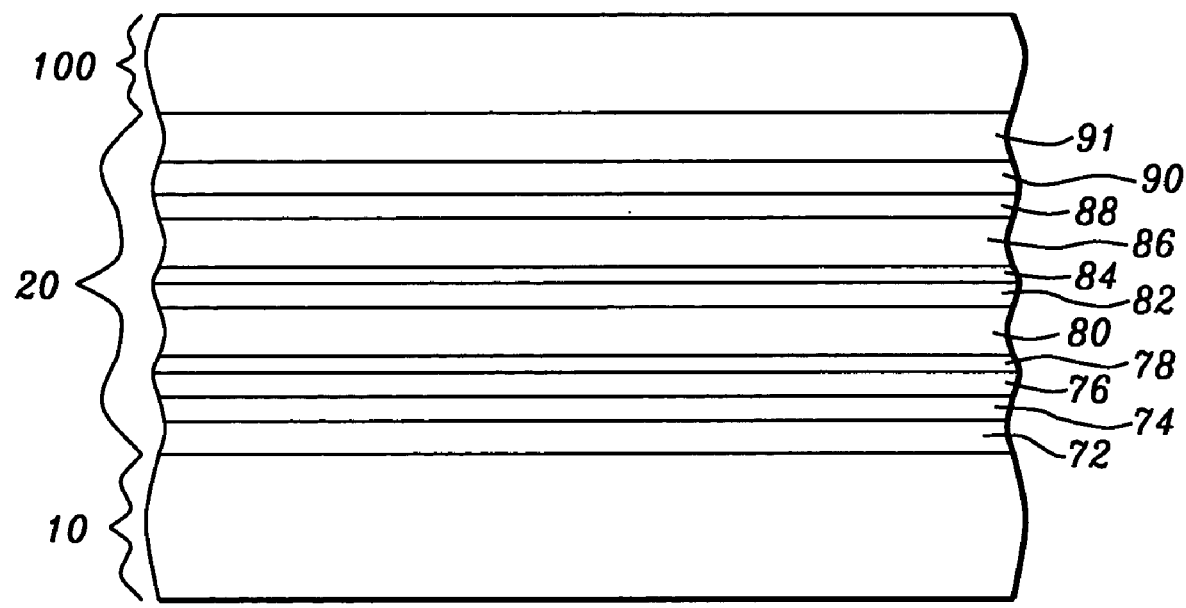

Referring next to FIG. 2d, there is shown a third exemplary free layer (20) which is a laminated configuration formed in accord with the present invention. The first layer of this free layer is a first layer of CoFe (72) formed to a thickness between approximately 2.5 and 7.5 angstroms, with approximately 5 angstroms being preferred. On this layer is formed a layer of Cu (74) of thickness between approximately 1 and 4 angstroms, with approximately 1 angstrom being preferred. On this Cu layer is formed a second layer of CoFe (76) of thickness between approximately 2.5 and 7.5 angstroms, with approximately 5 angstroms being preferred. On this CoFe layer is formed a lamina of FeCo (78) of thickness less than 3 angstroms, with approximately 0.5 angstroms being preferred. On this lamina is formed a third layer of CoFe (80) of thickness between approximately 2.5 and 7.5 angstroms, with approximately 5 angstroms being preferred. On this layer is formed a second Cu layer (82) of thickness between approximately 1 and 4 angstroms, with approximately 1 angstrom being preferred. On this Cu layer is formed a fourth layer of CoFe (84) of thickness between approximately 2.5 and 7.5 angstroms, with approximately 5 angstroms being preferred. On this CoFe layer there is formed a second lamina of FeCo (86) of thickness less than 3 angstroms, with approximately 0.5 angstroms being preferred. On this lamina is formed a fifth layer of CoFe (88) of thickness between approximately 2.5 and 7.5 angstroms with approximately 5 angstroms being preferred. On this CoFe layer is then formed a third layer of Cu (90) of thickness between approximately 1 and 4 angstroms, with approximately 1 angstrom being preferred. On this Cu layer is formed a sixth layer of CoFe(91) of thickness between approximately 2.5 and 7.5 angstroms, with approximately 5 angstroms being preferred. Testing of this configuration indicates a coefficient of magnetostriction, $\lambda=-8.00\times10^{-7}$ and a coercivity, $H_c=12.0$.

Figure 2E:
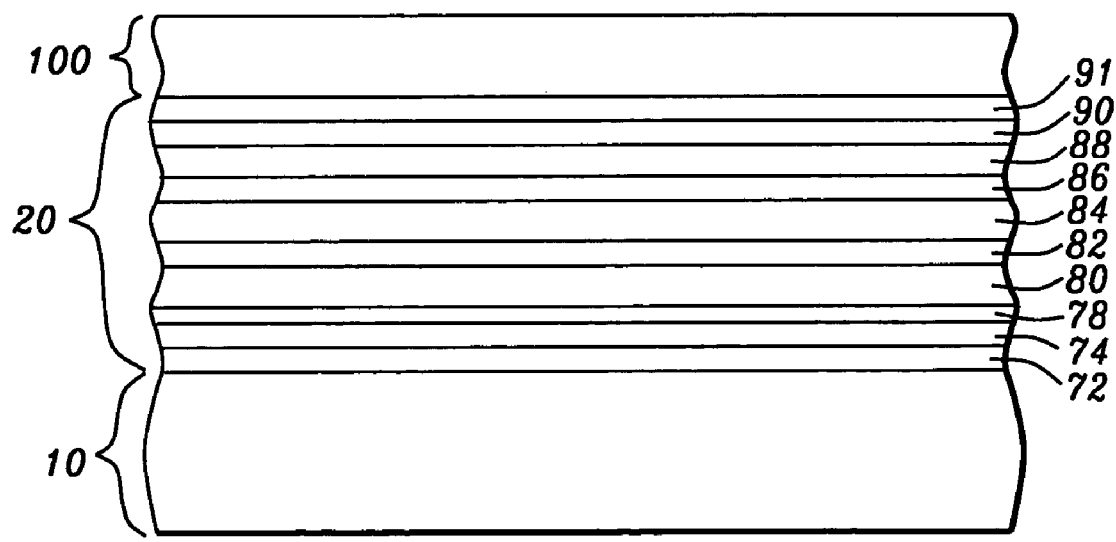

Referring next to FIG. 2e, there is shown a fourth exemplary free layer (20) which is a laminated configuration formed in accord with the present invention. The first layer of this free layer is a first layer of CoFe (102) formed to a thickness between approximately 2.5 and 7.5 angstroms, with approximately 5 angstroms being preferred. On this layer is formed a lamina of FeCo (104) of thickness less than 3 angstroms, with approximately 0.5 angstroms being preferred. On this lamina is formed a second layer of CoFe (106) of thickness between approximately 2.5 and 7.5 angstroms with approximately 5 angstroms being preferred. On this layer is formed a first layer of Cu (108) of thickness between approximately 1 and 4 angstroms, with approximately 2 angstrom being preferred. On this Cu layer is formed a third layer of CoFe (110) of thickness between approximately 2.5 and 7.5 angstroms, with approximately 5 angstroms being preferred. On this CoFe layer is formed a second lamina of FeCo (112) of thickness less than 3 angstroms, with approximately 0.5 angstroms being preferred. On this lamina is formed a fourth layer of CoFe (114) of thickness between approximately 2.5 and 7.5 angstroms, with approximately 5 angstroms being preferred. On this layer is formed a second Cu layer (116) of thickness between approximately 1 and 4 angstroms, with approximately 2 angstrom being preferred. On this Cu layer is formed a fifth layer of CoFe (118) of thickness between approximately 2.5 and 7.5 angstroms, with approximately 5 angstroms being preferred. On this CoFe layer there is formed a third lamina of FeCo (120) of thickness less than 3 angstroms, with approximately 0.5 angstroms being preferred. On this lamina is formed a sixth layer of CoFe (122) of thickness between approximately 2.5 and 7.5 angstroms with approximately 5 angstroms being preferred. Testing of this configuration indicates a coefficient of magnetostriction, $\lambda=-1.90\times 10^{-7}$ and a coercivity, $H_c=8.0$.

It is to be noted that one purpose of presenting these examples is to indicate the degree of control over magnetostriction and coercivity that is provided by the interspersal of the FeCo lamina and the Cu layers with the CoFe layers. Although the first example (FIG. 2a) provided a desirable positive magnetostriction, it should not be considered as the only configuration that would yield such a magnetostriction.

Figure 3A:
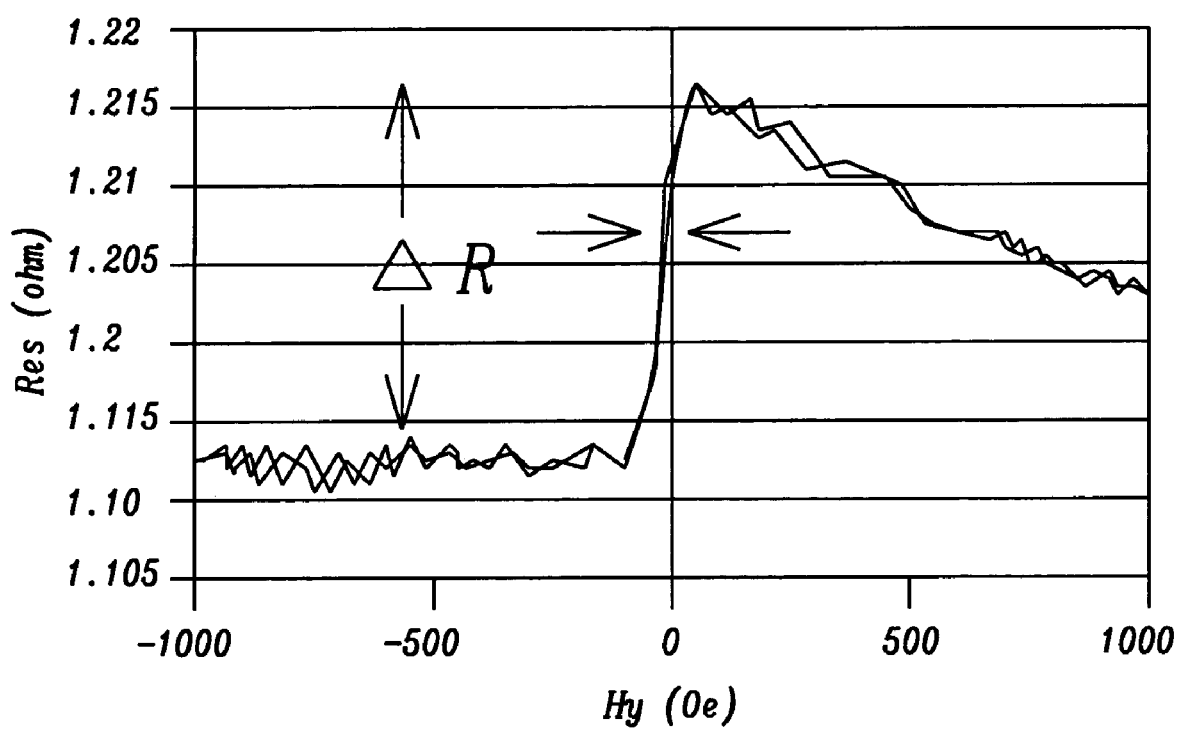
FIGS. 3*a–c* are graphs of sensor resistance vs. applied magnetic field for three different free layer configurations in otherwise identical sensor stack configurations, illustrating the improvement in coercivity for the laminated free layer of the present invention.
Figure 3B:
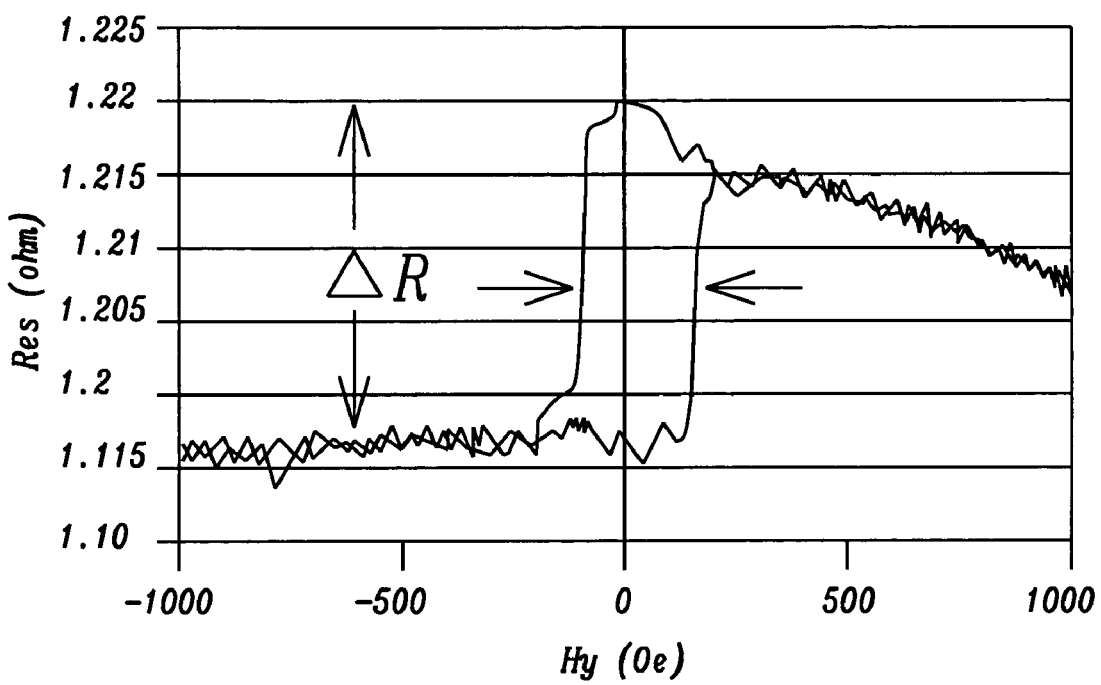
Figure 3C:
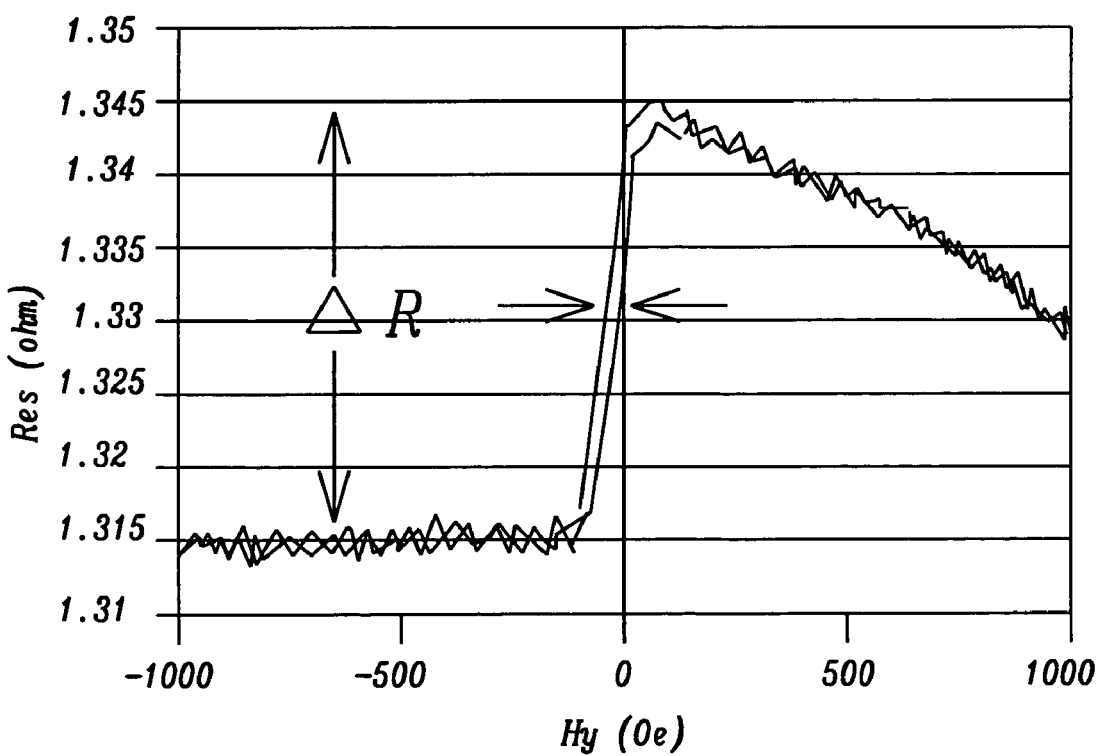

Referring next to FIGS 3a–c, there are shown three graphs, schematically indicating the relationship between CPP resistance (vertical axis) and applied magnetic field, Hy (Oe) (horizontal axis) for three different free layer configurations. The maximum height differential of the graphs (shown as $\Delta R$) is indicative of the GMR ratio ($\Delta R/R$) and the horizontal distance (arrows) between the two portions of the graph (forward and reverse swing of the magnetic field) is an indication of the coercivity of the free layer. Referring first to FIG. 3a, there is shown the performance of a prior art type free layer of the form (the numbers in parentheses being thicknesses in angstroms):

CoFe(10)/Cu(2)/CoFe(10)/Cu(2)/CoFe(10)

The graph is indicative of a low coercivity, which is measured to be approximately 6.2 Oe and a good GMR ratio of approximately 2.05%.

Referring next to FIG. 3b, there is shown the performance of a free layer containing only FeCo, specifically:

FeCo(10)/Cu(2)/FeCo(10)/Cu(2)/FeCo(10).

As has been previously noted, one of the disadvantages of FeCo is its high coercivity and this can be clearly seen in the graph. The measured coercivity of this configuration is 151 Oe and the GMR ratio is a good 2.25%. The good GMR ratio produced by FeCo has also been noted above.

Referring next to FIG. 3c, there is shown the performance of a free layer formed in accord with the present invention:

CoFe(10)/FeCo(0.5)/Cu(2)/FeCo(0.5)/CoFe(10)/FeCo(0.5)/Cu(2)/FeCo(0.5)/CoFe(10).

Figure 4A:
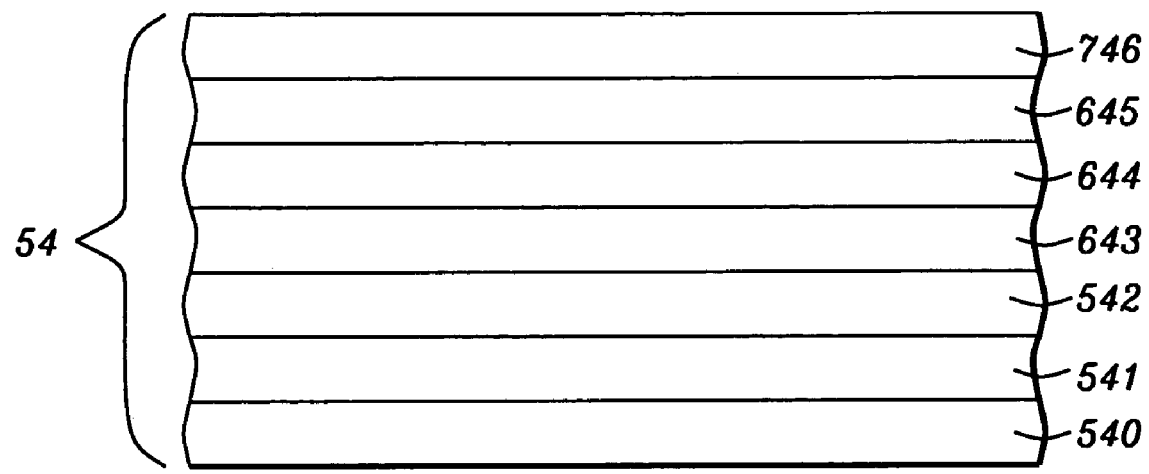
FIGS. 4*a* and *b* are schematic cross-sectional views of two synthetic antiferromagnetic pinned layers, with 4*a* formed in accord with the present invention.

As can be seen in the graph, the GMR ratio is quite similar to that displayed by the pure FeCo free layer (FIG. 3b), while the coercivity is comparable to that of the CoFe/Cu free layer of FIG. 3a. Specifically, the GMR ratio is 2.22% and the coercivity is 5.9 Oe. Referring next to FIG. 4a, there is shown a schematic cross-sectional view of a synthetic antiferromagnetic pinned layer such as is illustrated in prior art FIG. 1 as layer (48), but having one layer (the AP1 layer) formed in accord with the present invention. Referring again to FIG. 1, it is seen that the two ferromagnetic layers forming the pinning layer are designated AP1 (54) and AP2 (50), with AP1 being closest to the free layer. The present invention provides a laminated structure for the AP1 layer, utilizing FeCo layers in a thickness range between approximately 5 and 15 angstroms, with 10 angstroms being preferred, in place of the prior art CoFe layers. Note that the FeCo layers could also be layers of the Fe-rich ferromagnetic alloys Co75Fe25, Co70Fe30, Co60Fe40, Co65Fe35 or more generally $Co_xFe_{100-x}$ with x between 25 and 75. To this structure there is added thin layers of Cu, in a thickness range between 1 and 4 angstroms with approximately 2 angstroms being preferred. This new structure produces greatly improved sensor performance. Note, we are using the more generic term "layer" to describe the thicker FeCo layers in the pinned layer as opposed to our use of "lamina" as a distinguishing term to describe the ultra-thin layers of FeCo used in forming the free layer of the sensor.

Referring back to FIG. 4a, there is seen an enlarged cross-sectional schematic view of an AP1 layer (54), which is formed as a 7-layer structure, of which the first 3 layers (540), (541) and (542) are identical bilayers of (CoFe10/Cu2), the second 3 layers (643), (644) and (645) are identical bilayers of (FeCo10/Cu2) and the 7th layer (746) is a single layer of FeCo 10. All the numbers refer to thicknesses in angstroms.

Figure 4B:
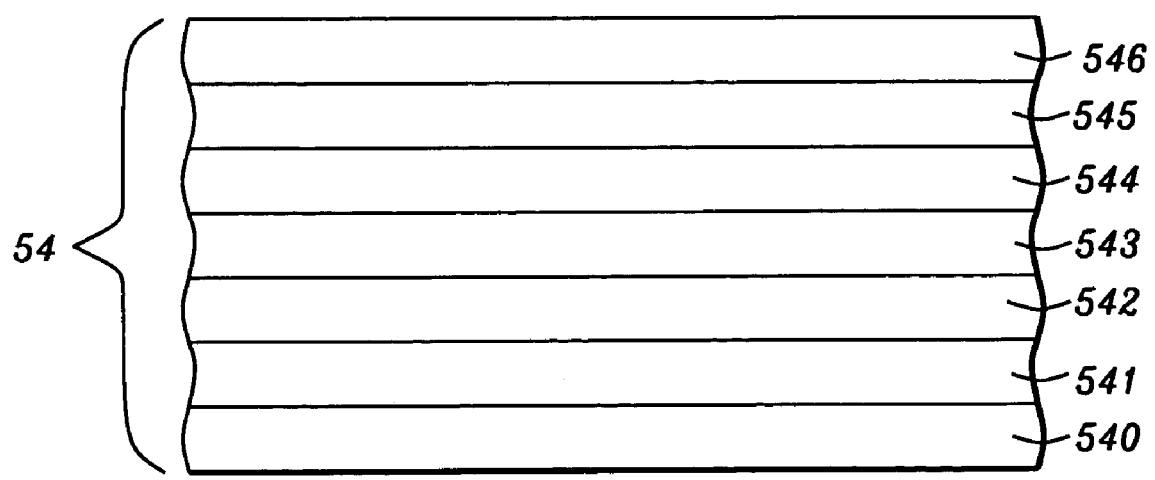

Referring next to FIG. 4b, there is shown a reference AP1 layer (54) of similar total magnetic moment, but formed of six identical (CoFe10/Cu2) bilayers (540), (541), (542), (543), (544) and (545) on a single layer of CoFe 10 (546) and therefore lacking any FeCo lamina. When the AP1 layers of FIGS. 4a and 4b were incorporated within an identical CPP sensor configuration, the layer of FIG. 4a, with FeCo lamina as indicated, demonstrated a marked improvement in sensor performance compared with the reference layer.

Figure 5A:
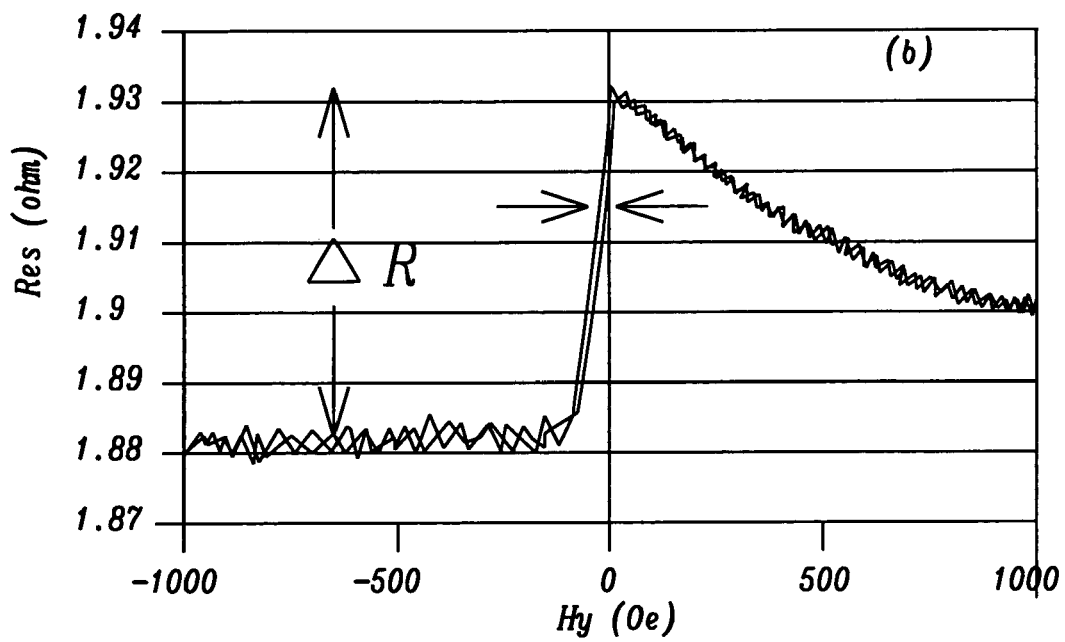
FIGS. 5*a–b* are graphs of sensor resistance vs. applied magnetic field for two different AP1 configurations within the pinned layer of otherwise identical sensor stack configurations, illustrating the improvement in GMR ratio for the laminated AP1 layer of the present invention.
Figure 5B:
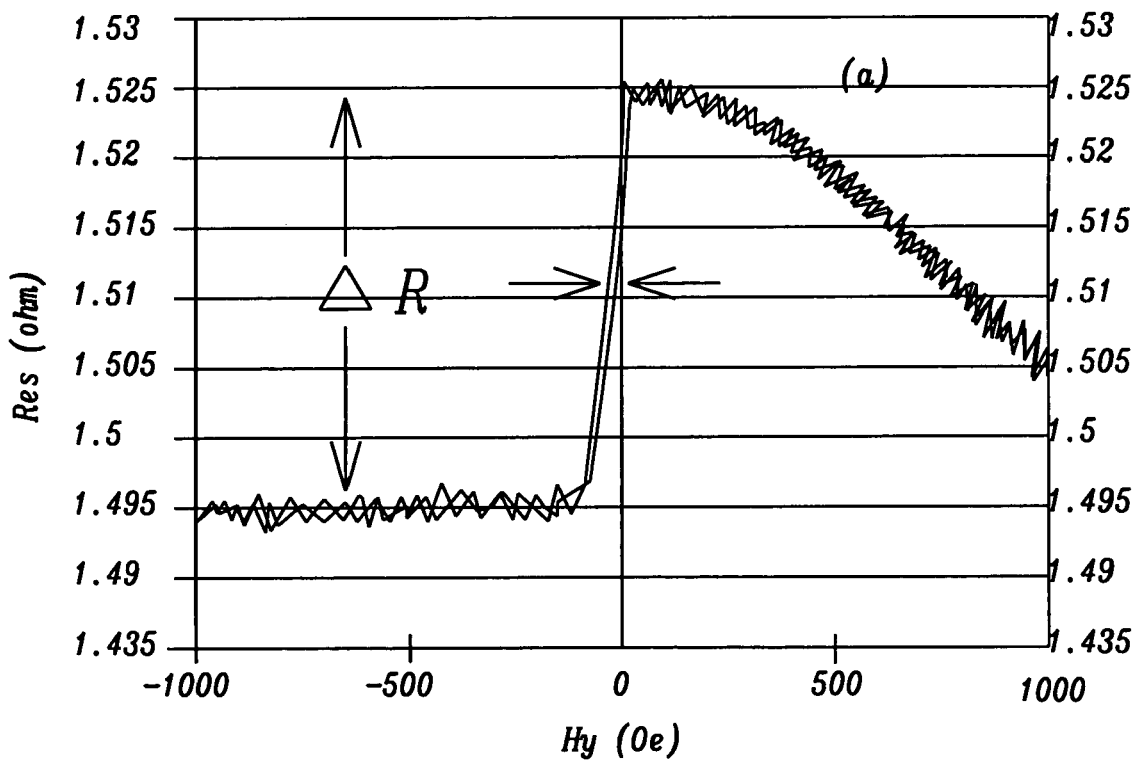

Referring next to FIGS 5a and b, there is shown graphical evidence of the improved performance of the FIG. 4a layered sensor element of the present invention as compared with the FIG. 4b layered sensor element. The two graphs plot variations in sensor resistance ($\Delta R$) as an external magnetic field sweeps in two directions (the GMR ratio being $\Delta R/R$), which is an indication of the sensor's sensitivity to the magnetic field variations in magnetically encoded media. The sensor element of FIG. 4a, as indicated in the graph of FIG. 5a, shows a GMR ratio of 2.25% that is enhanced by approximately 20% to the GMR ratio of 2.64% of the element of FIG. 4b as shown graphically in FIG. 5b.

As is understood by a person skilled in the art, the preferred embodiments of the present invention are illustrative of the present invention rather than limiting of the present invention. Revisions and modifications may be made to methods, materials, structures and dimensions employed in forming a CPP GMR sensor of the synthetic spin valve type whose laminated free layer has good coercivity, a high GMR ratio and low coefficient of magnetostriction, while still providing the CPP GMR sensor of the synthetic spin valve type whose laminated free layer has good coercivity, a high GMR ratio and low coefficient of magnetostriction so formed, in accord with the spirit and scope of the present invention as defined by the appended claims.

What is claimed is:

1. A current-perpendicular-to-plane (CPP) giant magnetoresistive (GMR) magnetic field sensor of the synthetic spin valve type comprising:

a substrate;

a seed layer formed on the substrate;

an antiferromagnetic pinning layer formed on the seed layer;

a synthetic antiferromagnetic pinned layer formed on the pinning layer, said pinned layer further comprising ferromagnetic layer AP2, formed on said pinning layer, a non-magnetic coupling layer formed on AP2 and ferromagnetic layer AP1 formed on said coupling layer;

a spacer layer formed on said AP1 layer;

a laminated free layer formed on said spacer layer, the free layer including a plurality of layers of a second ferromagnetic material, each said layer being formed to a thickness between approximately 2.5 and 15 angstroms and each said layer being separated from an adjacent said layer by a lamina of a first ferromagnetic material formed to a thickness less than approximately 3 angstroms or by a Cu spacer layer formed to a thickness between approximately 1 and 4 angstroms; and wherein each said lamina of said first ferromagnetic material has a positive coefficient of magnetostriction and each said layer of said second ferromagnetic material has a negative coefficient of magnetostriction, whereby the coefficient of magnetostriction of said free layer can be made positive or negative, wherein said laminated free layer includes at least one lamina of said first ferromagnetic material; and a capping layer formed on said free layer.

2. The sensor of claim 1, wherein said first ferromagnetic material is any of the ferromagnetic alloys of the form $Co_xFe_{100-x}$ with x between 25 and 75 and said second ferromagnetic material is $Co_{90}Fe_{10}$.

3. The sensor of claim 2 wherein said AP1 layer includes at least one layer of said first ferromagnetic material formed to a thickness between approximately 2.5 and 15 angstroms and at least one layer of said second ferromagnetic material of thickness between approximately 2.5 and 15 angstroms.

4. The sensor of claim 1 wherein said free layer comprises:
a first layer of $Co_{90}Fe_{10}$;
a first lamina of $Fe_{50}Co_{50}$ formed on said first layer;
a second layer of $Co_{90}Fe_{10}$ formed on said first lamina;
a first spacer layer of Cu formed on said first lamina;
a third layer of $Co_{90}Fe_{10}$ formed on said first spacer layer;
a second lamina of $Fe_{50}Co_{50}$ formed on said second layer;
a fourth layer of $Co_{90}Fe_{10}$ formed on said second lamina;
a second spacer layer of Cu formed on said third layer;
a fifth layer of $Co_{90}Fe_{10}$ formed on said second spacer layer.

5. The sensor of claim 4 wherein the thickness said first layer is between approximately 5 and 15 angstroms, the thickness of said second, third, fourth and fifth layers is between approximately 2.5 and 7.5 angstroms, the thickness of each lamina is less than approximately 3 angstroms and the thickness of each spacer layer is between approximately 1 and 4 angstroms.

6. The sensor of claim 5 wherein the laminated configuration of the free layer produces a positive coefficient of magnetostriction.

7. The sensor of claim 1 wherein said AP1 layer includes a lamination of bilayers, wherein each bilayer is a layer of $Fe_{50}Co_{50}$, of thickness between approximately 7.5 and 15 angstroms, formed on a layer of Cu of thickness between approximately 1 and 4 angstroms.

8. A method of forming a current-perpendicular-to-plane (CPP) giant magnetoresistive (GMR) magnetic field sensor of the synthetic spin valve type having a coefficient of magnetostriction that can be varied from positive to negative by changing a laminated configuration of its free layer comprising:
providing a substrate;
forming a seed layer on the substrate;
forming an antiferromagnetic pinning layer on the seed layer;
forming a synthetic antiferromagnetic pinned layer on the pinning layer, said formation further comprising forming ferromagnetic layer AP2 on said pinning layer, forming a non-magnetic coupling layer on AP2 and forming ferromagnetic layer AP1 on said coupling layer;
forming a spacer layer on said AP1 layer;
forming a laminated free layer on the spacer layer, said laminated free layer including a plurality of layers of a second ferromagnetic material, each said layer being formed to a thickness between approximately 2.5 and 15 angstroms and each said layer being separated from an adjacent said layer by a lamina of a first ferromagnetic material formed to a thickness less than approximately 3 angstroms or by a Cu spacer layer formed to a thickness between approximately 1 and 4 angstroms; and wherein each lamina of said first ferromagnetic material has a positive coefficient of magnetostriction and each layer of said second ferromagnetic material has a negative coefficient of magnetostriction, whereby the number and arrangement of laminas of said first ferromagnetic material and the number and arrangement of layers of said second ferromagnetic material determine a coefficient of magnetostriction of the free layer having a value within a range from positive to negative, wherein said laminated free layer includes at least one lamina of said first ferromagnetic material; then
forming a capping layer on said free layer.

9. The method of claim 8, wherein said first ferromagnetic material is the ferromagnetic alloy of the form $Co_xFe_{100-x}$ with x between 25 and 75 and said second ferromagnetic material is $Co_{90}Fe_{10}$.

10. The method of claim 8 wherein formation of said free layer comprises:
forming a first layer of $Co_{90}Fe_{10}$;
forming a first lamina of $Fe_{50}Co_{50}$ on said first layer;
forming a second layer of $Co_{90}Fe_{10}$ on said first lamina;
forming a first spacer layer of Cu on said first lamina;
forming a third layer of $Co_{90}Fe_{10}$ on said first spacer layer;
forming a second lamina of $Fe_{50}Co_{50}$ on said second layer;
forming a fourth layer of $Co_{90}Fe_{10}$ on said second lamina;
forming a second spacer layer of Cu on said third layer;
forming a fifth layer of $Co_{90}Fe_{10}$ on said second spacer layer.

11. The method of claim 10 wherein the thickness said first layer is between approximately 5 and 15 angstroms, the thickness of said second, third, fourth and fifth layers is between approximately 2.5 and 7.5 angstroms, the thickness of each lamina is less than approximately 3 angstroms and the thickness of each spacer layer is between approximately 1 and 4 angstroms.

12. The method of claim 8 wherein the laminated configuration of the free layer produces a positive coefficient of magnetostriction.

13. The method of claim 8 wherein said AP1 layer includes a lamination of bilayers, wherein each bilayer is a layer of $Fe_{50}Co_{50}$, of thickness between approximately 7.5 and 15 angstroms, formed on a layer of Cu of thickness between approximately 1 and 4 angstroms.

* * * * *